United States Patent

Suzuki et al.

[11] Patent Number: 5,866,961
[45] Date of Patent: *Feb. 2, 1999

[54] MOTOR STRUCTURE

[75] Inventors: Yuzuru Suzuki, Shizuoka; Sakae Fujitani, Hamakita; Taketoshi Ohyashiki, Shizuoka, all of Japan

[73] Assignee: Minebea Co., Ltd., Nagano, Japan

[*] Notice: This patent issued on a continued prosecution application filed under 37 CFR 1.53(d), and is subject to the twenty year patent term provisions of 35 U.S.C. 154(a)(2).

[21] Appl. No.: 622,409

[22] Filed: Mar. 27, 1996

[30] Foreign Application Priority Data

Mar. 28, 1995 [JP] Japan .................................. 7-069783

[51] Int. Cl.⁶ .................................................. H02K 7/100
[52] U.S. Cl. ............................ 310/67 R; 310/44; 310/45; 310/43
[58] Field of Search ...................... 310/67 R, 43, 310/44, 45; 360/99.08

[56] References Cited

U.S. PATENT DOCUMENTS

| | | | |
|---|---|---|---|
| 4,529,900 | 7/1985 | Uzuka | 310/43 |
| 4,623,952 | 11/1986 | Pexton | 361/220 |
| 5,038,240 | 8/1991 | Isomura | 360/99.08 |
| 5,057,732 | 10/1991 | Fukaya | 310/208 |
| 5,191,698 | 3/1993 | Sumi et al. | 29/596 |
| 5,254,895 | 10/1993 | Koizumi | 310/156 |
| 5,331,237 | 7/1994 | Ichimura | 310/44 |
| 5,337,374 | 8/1994 | Konishikawa | 384/107 |
| 5,381,066 | 1/1995 | Miyaji et al. | 310/90 |

FOREIGN PATENT DOCUMENTS

| | | |
|---|---|---|
| 0 652 622 | 5/1995 | European Pat. Off. . |
| 56-139060 | 10/1981 | Japan . |
| 4-58753 | 2/1992 | Japan . |
| 4058753 | 2/1992 | Japan . |
| 4-183237 | 6/1992 | Japan . |
| 91 09441 | 6/1991 | WIPO . |

*Primary Examiner*—Thomas M. Dougherty
*Assistant Examiner*—Timothy A Williams
*Attorney, Agent, or Firm*—Staas & Halsey

[57] ABSTRACT

A motor structure having a stator core including an armature coil wound on stator plates and arranged in parallel on the surface of the motor mounting plate and a bearing mechanism for supporting a rotor rotatably provided at the center of the stator oppositely to the stator wherein the stator core is coupled by an integrally molded form with a housing for holding the bearing mechanism

2 Claims, 4 Drawing Sheets

MOTOR STRUCTURE

BACKGROUND OF THE INVENTION

1. (Field of the Invention)

This invention relates to an improvement in a structure of a thin DC brushless motor and, more particularly, to a bearing structure of a thin DC brushless motor.

2. (Description of the Prior Art)

A thin DC brushless motor has been frequently used as a rotary drive source of a floppy disk drive for a personal computer. FIG. 4 is a sectional view showing a conventional thin DC brushless motor illustrating the state that a rotor is rotatably provided on a motor mounting plate formed of a printed circuit board. In FIG. 4, numeral 1 denotes a board as a motor mounting plate, which is made of a ferromagnetic material such as steel and on which a printed wiring circuit is formed on the surface through a thin insulating layer, and an electronic component such as an IC for a motor drive circuit is mounted. A circular hole 2 is perforated at the board 1, a bearing base 3 is engaged within the circular hole 2, and clamped at the board with screws 4. Two ball bearings 5 and 6 are secured to the bearing base 3.

Numeral 7 designates a rotating disk for rotating the floppy disk to constitute a rotor in a thin circular dish shape. The rotating poles 9 made of a ringlike permanent magnet are fixed to the inside of the outer periphery 8 of the rotating disk 7. A speed detecting permanent magnet 10 for detecting the rotating speed of the rotating disk 7 is fixed to the lower part of the outer periphery 8 of the rotating disk 7. The poles 9 made of the permanent magnet are formed of rare earth metal or the like in a ring shape as shown in FIG. 5. A magnetic shielding plate 30 formed of soft iron similarly in a ring shape is engaged outside the poles 9. A plurality of permanent magnets is formed at the poles 9 by magnetizing. These permanent magnets are magnetized in the radial direction of the poles 9 in such a manner that the polarity directions of these poles are opposite at the adjacent poles. A rotating disk 7 assembly including the poles 9 constitutes a rotor.

A rotating shaft mounting plate 11 made of brass is fixed to the center of the rotating disk 7 and receives thereon circular member 24. A rotating shaft 12 is fixed to the center of the rotating shaft mounting plate 11. The rotating shaft 12 is rotatably mounted at the ball bearings 5 and 6. As also known in the art, reference numeral 13 denotes a hole receiving a driving pin 14 which chucks to a floppy disk and transmits a rotating force of the rotating disk 7 thereto. The numeral 15 is a leaf spring which biases the drive pin 14 upwardly and downwardly in accordance with loading of the floppy disk. The numeral 22 is a coil wound on the stator pole 21 to generate a magnetic pole. The numeral 25 is an electric terminal for an electric current flowing from the mounting plate 1 to the ground.

In a conventional thin DC brushless motor shown in FIGS. 4 and 5, the bearing base 3 for holding the ball bearings 5, 6 for rotatably supporting the rotating shaft 12 is constructed separately from a stator frame 23 having a stator core 31 and stator poles 21. However, such a thin DC brushless motor has been required to be reduced in size and thickness without decreasing its output in the development of a light, thin, short and small articles.

Therefore, to maintain the output of the conventional thin DC brushless motor in a smaller space, a gap G between the rotating poles 9 and the stator poles 21 is reduced to its critical limit. In this respect, the squareness of the rotating shaft 12 to the stator poles 21 becomes a problem. The squareness cannot be obtained in a stable accuracy maintained accurately since the stator poles 21 and the bearing base 3 for receiving the bearings 5, 6 are have been formed separately, and respectively fixed to the board 1.

This invention is constituted in view of the above-described circumstances, and an object of this invention is not only to facilitate the squareness management of the bearing mechanism for the stator poles 21 but also to reduce the cost by the decrease in the number of components.

SUMMARY OF THE INVENTION

There has been a method of reducing a gap between a rotor and a stator to raise the efficiency of a magnetic circuit and obtain the same output as the conventional motor with a reduced size. However, if the gap is reduced, the gap is further decreased from a set value due to the inclination of the rotor shaft (rotating shaft) to the stator and the concentricity of the stator and the rotor, and hence contact of the stator with the rotor may occur. A motor structure having concentricity of the stator with the rotor, but without the inclination, can be manufactured by integrating both the stator and the housing of the bearing, since the inclination of the shaft and the coaxiality are determined according to the accuracy of the stator and the housing of the bearings.

This invention will be further described in detail. The motor structure according to this invention comprises a stator having a stator core including an armature coil wound on stator plates having fixed poles and arranged in parallel on the surface of a motor mounting plate and a bearing mechanism for supporting a rotor rotatably provided at the center of said stator oppositely to said stator, wherein said stator core is integrally molded with a housing for holding said bearing mechanism. The motor is a thin DC brushless motor. The molded form integral with said housing is a polymer material which can contain soft magnetic material. The motor mounting plate arranged with said stator is mounted with an insulated electric wiring circuit and an electronic component on said mounting plate. The motor mounting plate arranged with said stator is made of metal.

A conductive material for conducting with either the metal part of said metal motor mounting plate or a ground circuit of the electric circuit insulated from said part, or both the metal part of said metal motor mounting plate and a ground circuit of the electric circuit insulated from said part, is preferably provided on a rotational shaft conducted with said rotor. The housing may support a rotating shaft for directly holding said rotor.

The stator is integrated with the housing for the bearings reduce the number of the components. Further, the coaxiality of the stator core with the rotor magnet of can be more accurately, and hence a stable motor structure having small unevenness can be obtained.

DESCRIPTION OF THE PREFERRED EMBODIMENTS

Figure 1:
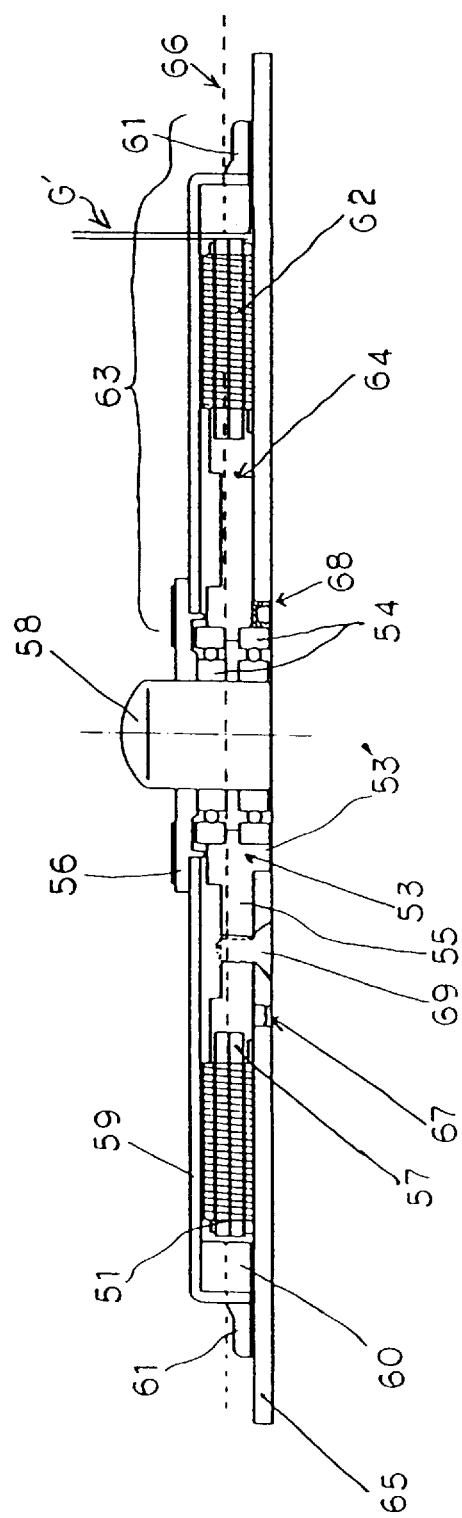
FIG. 1 is a sectional view showing an embodiment of this invention.
Figure 2:
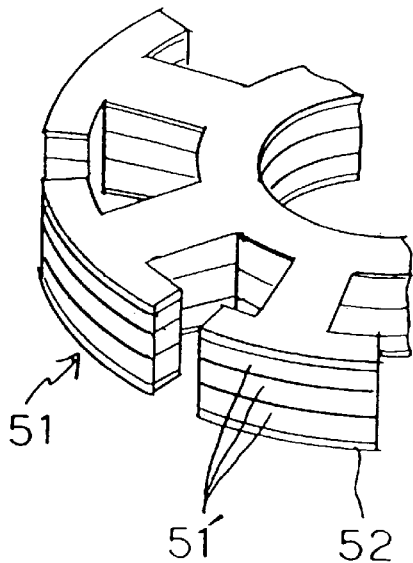
FIG. 2 is a partial perspective view showing a stator core.

An embodiment of this invention will be described in detail with respect to the accompanying drawings. FIG. 1 is a sectional view of a thin DC brushless motor according to this invention. In FIG. 1, numeral 51 denotes a stator core. The stator core 51 is formed, as shown in FIG. 2, by adhering or coating the surface of a laminate of stator plates 51' made of soft magnetic metal thin plates with an insulating layer 52 for insulating to an armature coil 62. Numeral 57 designates a stator. The armature coil 62 is wound on the surface of the stator core 51. Numeral 53 indicates a housing for fixedly containing ball bearings 54 as bearings of a rotating shaft 58. Numeral 55 depicts a stator frame material for coupling the housing 53 and the stator 57 with synthetic resin. The detailed description will be explained later.

Figure 5:
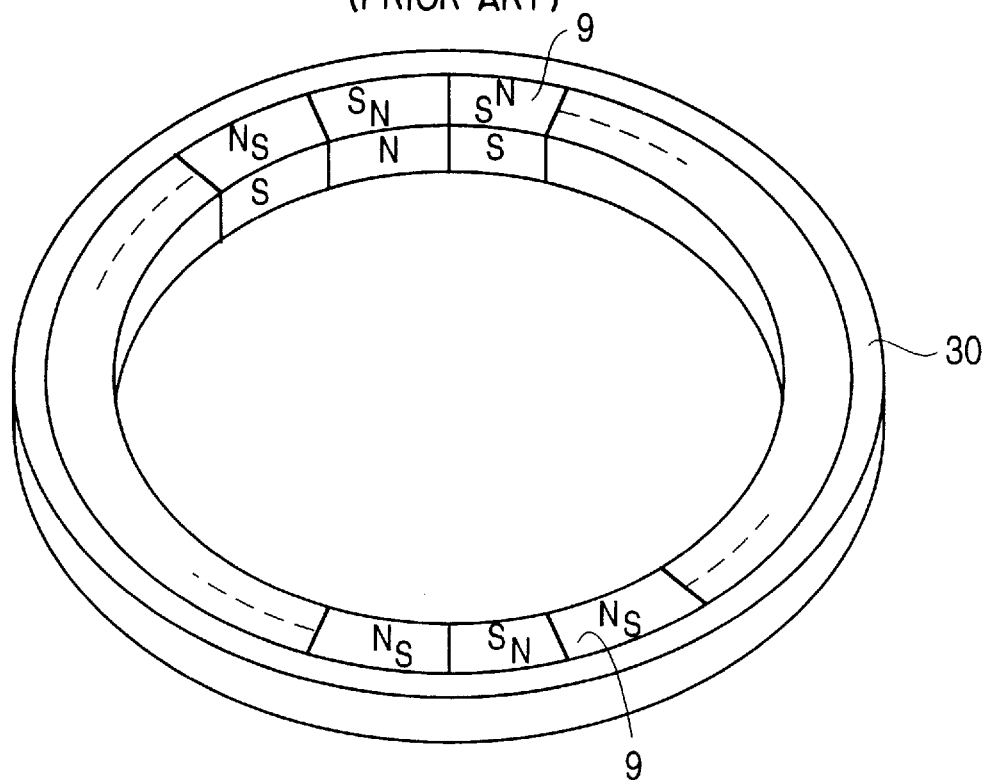
FIG. 5 is a perspective view showing a rotor magnet.

The rotating shaft 58 is supported by the ball bearings 54. A hub base 56 is fixed to the rotating shaft 58. Further, a rotor yoke 59 made of soft iron plate in a thin disk shape is mounted on the outer periphery of the hub base 56. A rotor magnet 60 is fixed as the rotating poles similarly to the prior art as shown in FIG. 5 to the inside of the outer periphery of the rotor yoke 59. A gap G' exists between the rotor magnet 60 and the end of the stator core 51. Numeral 61 denotes a permanent magnet for detecting a speed similarly to the prior art. A rotor 63 is formed of the hub base 56, the rotor yoke 59, the rotor magnet 60 and the speed detecting permanent magnet 61.

A method of manufacturing the structure of a stator assembly 64 and a method of mounting it on a board 65 as a motor mounting plate similar to the conventional motor having a printed wiring circuit according to the features of this invention will be described. The stator core 51 having the insulating layer 52 for insulating to the armature coil 62 and the housing 53 for holding the ball bearings 54 as the bearers of the rotating shaft 58 of the rotor 63 are integrally molded together using synthetic resin made of liquid crystal polymer resin or the like.

In the molds used at the time of the integral molding, the position of the hole for containing the ball bearings 54 is so accurately determined with the outer periphery of the stator core 51 as a reference as to be the center of the outer periphery of the stator core 51, and the position of the hole for containing the bearings 54 to be provided in the housing 53 to contain the two bearings 54 is so determined that the rotating shaft 58 is held to be rotated perpendicularly to the reference surface 66 of the stator assembly 64. At the time of molding the stator assembly 64, bosses 67 for positioning on the board 65 are provided, and a conductive plate 68 for discharging static electricity generated on the disk to be rotatably driven on the rotor 63 is integrally molded on the metal plate for constituting the ground circuit of the printed wiring circuit of the board 65 or the board by the rotating shaft 58 by disposing on the surface of the housing 53 in contact with the disk to be rotatably driven. A protrusion 53' to be engaged with the hole provided at the board 65 is provided at the lower surface of the housing 53.

To reduce the magnetic reluctance of the entire stator structure, soft magnetic powder such as iron oxide may be mixed with the synthetic resin for the injection molding. The above-described soft magnetic powder may also be mixed within the insulating layer 52 for covering the surface of the stator plate 51'. In the embodiment described above, the rotating shaft is supported by the ball bearings 54 held in the housing.

However, the ball bearings 54 may be omitted, and a structure for rotatably supporting the rotating shaft in a bearing hole provided in the housing may be employed.

After the armature coil 62 is wound on the stator core 51 of the stator assembly 64 formed as described above, the ball bearings 54 are mounted in the hole of the housing 53 with the outer periphery of the stator core 51 as a reference, the bosses 67 and the protrusion 53' of the housing 53 are engaged with the positioning hole provided at the board 65, and the stator assembly 64 is mounted on the board 65 with mounting screws 69. Though not shown, at this time, the conductive plate 68 is contacted with the metal plate for constituting the ground circuit board of the printed wiring circuit of the board 65 or with the both.

In the case of assembling the rotor 63, the rotating shaft 58 is first press-fitted in the hub base 56, the hub base 56 is inserted into the rotor yoke 59, caulked, the coaxiality of the rotating shaft 58 with the inner periphery of the rotor magnet 60 is obtained, and the rotor magnet 60 is then adhesively secured to the rotor yoke 59 at the inner periphery of the rotor yoke 59 in this state.

Figure 3:
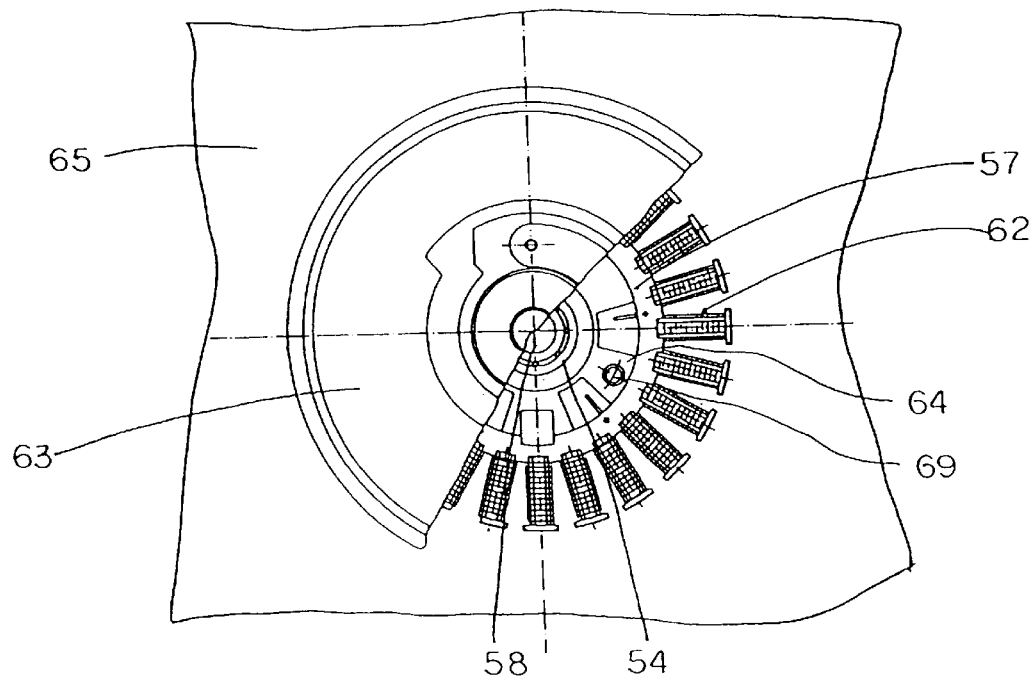
FIG. 3 is a plane view showing the motor of the embodiment of this invention partly in cutout section of the rotor.
Figure 4:
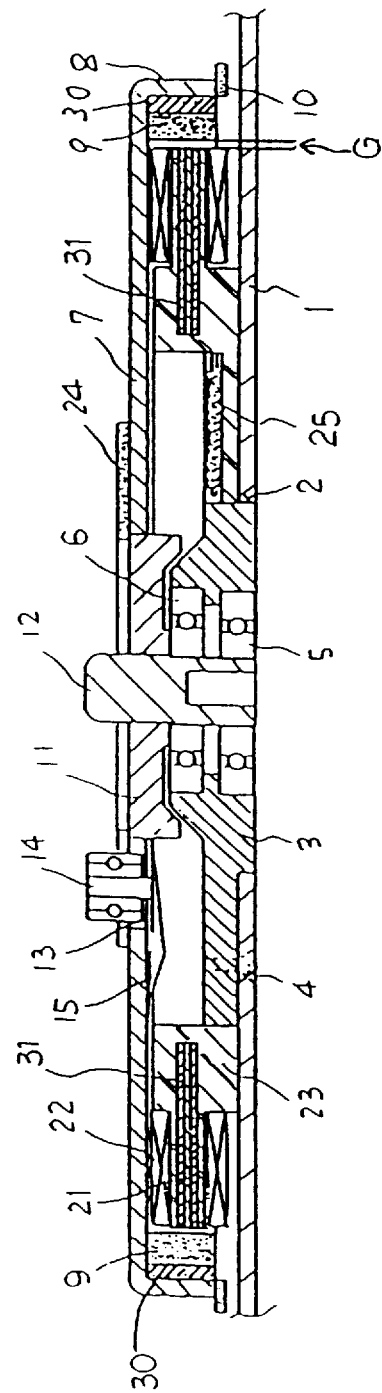
FIG. 4 is a sectional view showing a conventional motor structure.

Then, the rotating shaft 58 of the rotor is inserted into the ball bearings 54 of the stator assembly 64 mounted on the board 65 as described above, and a preload is applied to the ball bearings 54 to adhesively adhere the inner races of the ball bearings 54 to the rotating shaft 58. FIG. 3 is a plane view showing the rotor of the motor assembled along axis 66 partly in section as described above.

This invention has been described with respect to the embodiments described above. However, the invention in its broader aspects is not limited to the specific details, and representative devices shown and described herein. Accordingly, various modifications may be made without departing from the spirit or scope of the general inventive concept as defined by the appended claims and their equivalents. For example, the material of the molding resin of the stator assembly may also be made of ABS resin. The material of the conductive plate may be made of conductive rubber so as not to incorporate the conductivity with the rotating shaft, or the shape may be formed in a square sectional shape. Further, the ball bearings may be integrated together with the stator assembly at the time of molding to improve the positional accuracy of the stator assembly with the ball bearings.

According to this invention as described above, the housing for constituting the stator and the bearing of the stator which have been heretofore separate can be integrated. Therefore, the number of the components can be deleted. The coaxiality of the stator core with the rotor magnet of enhanced, making the motor less uneven and stable.

What is claimed is:

1. A motor structure, comprising:

a stator, having a stator core including an armature coil wound on stator plates, and having stator poles and being arranged in parallel on the surface of a motor mounting plate;

a bearing mechanism for supporting a rotor, rotatably provided at the center of said stator; and a housing for the bearing mechanism, said housing being molded of insulating material, wherein said stator core is integrally molded as one piece with the housing, and with said bearing mechanism.

wherein said stator core, said housing and said bearing mechanism are integrally molded as one piece using a polymer material, wherein said polymer material contains soft magnetic material, wherein said motor mounting plate is metal and includes an electric wiring circuit and an electronic component thereon, and wherein a conductive material for conducting with at least one of said metal motor mounting plate and a ground circuit of the electric wiring circuit is provided on a rotational shaft conducted with said rotor, and wherein a protrusion extending from an under surface of said housing is engaged with a hole provided at said motor mounting plate.

2. A motor structure according to claim 1, wherein said motor is a thin DC brushless motor.

* * * * *